United States Patent
Allen

(10) Patent No.: US 9,389,985 B2
(45) Date of Patent: Jul. 12, 2016

(54) CODEPATH INTEGRITY CHECKING

(71) Applicant: Abbott Medical Optics Inc., Santa Ana, CA (US)

(72) Inventor: Rennie G Allen, Lake Elsinore, CA (US)

(73) Assignee: Abbott Medical Optics Inc., Santa Ana, CA (US)

( * ) Notice: Subject to any disclaimer, the term of this patent is extended or adjusted under 35 U.S.C. 154(b) by 106 days.

(21) Appl. No.: 13/758,656

(22) Filed: Feb. 4, 2013

(65) Prior Publication Data

US 2014/0223238 A1 Aug. 7, 2014

(51) Int. Cl.
G06F 11/00 (2006.01)
G06F 11/36 (2006.01)
G06F 11/10 (2006.01)
G06F 21/00 (2013.01)

(52) U.S. Cl.
CPC ........ G06F 11/3668 (2013.01); G06F 11/1004 (2013.01); G06F 11/3612 (2013.01); G06F 11/3644 (2013.01); G06F 21/00 (2013.01)

(58) Field of Classification Search
CPC .................................................. G06F 11/3668
See application file for complete search history.

(56) References Cited

U.S. PATENT DOCUMENTS

| | | | |
|---|---|---|---|
| 5,974,529 A | 10/1999 | Zumkehr et al. | |
| 6,839,055 B1 * | 1/2005 | Nguyen | 345/204 |
| 8,849,441 B2 * | 9/2014 | Boyden et al. | 700/117 |
| 2004/0015748 A1 | 1/2004 | Dwyer | |
| 2007/0011541 A1 * | 1/2007 | Kogan et al. | 714/737 |
| 2011/0047532 A1 * | 2/2011 | Wang | 717/130 |
| 2011/0197049 A1 * | 8/2011 | Adir et al. | 712/234 |
| 2014/0101641 A1 * | 4/2014 | Staples et al. | 717/130 |

OTHER PUBLICATIONS

Microsoft Computer Dictionary, Microsoft Pres, 1999, pp. 84,116.*
International Search Report and Written Opinion for Application No. PCT/US2014/014546 mailed on May 26, 2014, 12 pages.
Jafari-Nodoushan M., et al., "Control-Flow Checking Using Branch Instructions." IEEE/IFIP International Conference on Embedded and Ubiquitous Computing, 2008, pp. 66-72.
Oh N., et al., "Control-Flow Checking by Software Signatures." IEEE Transactions on Reliability, 2002, vol. 51 (2), pp. 111-122.

(Continued)

Primary Examiner — Christopher McCarthy
(74) Attorney, Agent, or Firm — Abbott Medical Optics Inc.

(57) ABSTRACT

A method and apparatus for testing code is provided. The method includes inserting at least one token in program code, wherein each token comprises a code element able to provide a value during runtime, establishing a baseline code version and an executing code version from the program code, and subjecting the executing code version to various testing conditions using a processing device. Subjecting the executing code version to various testing conditions comprises periodically evaluating at least one executing code token having one associated executing error detection value against the at least one baseline code token having one associated baseline error detection value and reporting an error when at least one executing code token and associated executing error detection pair fails to match at least one baseline code token and associated baseline error detection pair.

14 Claims, 4 Drawing Sheets

(56) References Cited

OTHER PUBLICATIONS

Vector Software, About Vector Software—Company Timeline, 2004 Vector Software releases VectorCAST/C++, a C++ version of their popular test tool for embedded software testing. http://www.vectorcast.com/company.

Vector Software—VectorCAST/C++ User's Guide Version 62., 2014, pp. 1-529.

* cited by examiner

```
int var;
runtimeCodepathVerificationInit(STATE0, MODTOKEN);

while(1)
{
    var=readInput();

if(var < X)
    {
        runtimeCodepathVerificationStatePoint(STATE1);
        runtimeCodepathVerificationPoint(TOKEN1321);
        /* change state to STATE1 and do var < X processing ... */
    }
    else if(var > X)
    {
        runtimeCodepathVerificationStatePoint(STATE2);
        runtimeCodepathVerificationPoint(TOKEN1322);
        /* change state to STATE2 and do var > X processing ... */
    }
    runtimeCodepathVerificationPoint(TOKEN1320);
}
```

FIG. 2

CODEPATH INTEGRITY CHECKING

BACKGROUND

1. Field

The present invention relates generally to computing systems and more specifically to codepath verification for code employed in computing systems.

2. Description of the Related Art

Current computing systems employ various means for detecting faults in code employed in the system. In certain mission critical systems, including but not limited to medical systems, defense systems, financial systems, and the like, the presence of code errors can be problematic at best and disastrous at worst. Automatic fault detection is typically employed in such mission critical systems in the form of toolkits that facilitate the recovery of systems that have experienced a fault. While such toolkits can be beneficial, they typically only assist after the fact, i.e. after a fault has occurred. Detection of problems before the fact, such as when a system is exhibiting incorrect behavior, can be difficult for the system. Such errant behavior may be apparent to a human observing system performance.

Faults such as memory leaks, address space violations, operating system resource leaks and processor leaks, such as unbound looping or spins, can be detected in many instances. However, a number of other faults may occur, and such faults cannot be detected easily.

Various mechanisms for code checking currently exist, such as algorithmic integrity checking and runtime integrity chain verification.

Algorithmic integrity checking seeks to verify that a computed value is valid and is implemented in various ways, such as computing a value using an algorithm different and separate from the main algorithm, or range checking the output of the main algorithm against a value produced by a monitoring algorithm. In deterministic situations, i.e. situations where only one answer is correct, CRC (cyclic redundancy checking) or checksums have been employed on the output of the algorithm, verified using precomputed known good values. Algorithmic integrity checking is useful for validating that a particular algorithm or program produced a valid answer. However, algorithmic integrity checking provides no insight as to how the algorithm arrived at the answer. In certain instances, the algorithm may arrive at the correct output even though performing the algorithm improperly. Such issues can delay detection of a faulty computing system.

Runtime integrity checking allows the monitoring system to determine how the observed system produced the output. Currently available runtime integrity checking tend to be CPU and/or development time intensive as they attempt to explicitly describe the execution chain and are used to detect and prevent malicious activity that leads to improper codepath execution, but as noted tends to be time consuming and can consume a great deal of system resources.

It would therefore be beneficial to offer a codepath checking procedure that overcomes present systems known in the art.

SUMMARY

Thus according to one aspect of the present invention, there is provided a method and apparatus for testing code. The method includes inserting at least one token in program code, wherein each token comprises a code element able to provide a value during runtime, establishing a baseline code version and an executing code version from the program code, and subjecting the executing code version to various testing conditions using a processing device. Subjecting the executing code version to various testing conditions comprises periodically evaluating at least one executing code token having one associated executing error detection value against the at least one baseline code token having one associated baseline error detection value and reporting an error when at least one executing code token and associated executing error detection pair fails to match at least one baseline code token and associated baseline error detection pair.

Alternately, the present design may include providing a plurality of tokens in program code, establishing baseline code and testing code from the program code, determining error detection values for tokens in the baseline code, employing the processing device to subject the testing code to various testing conditions, comparing error detection values obtained from the testing code subjected to various testing conditions for tokens in the testing code to the error detection values for corresponding tokens in the baseline code, and establishing an error condition when error detection values from the testing code fail to match error detection codes for corresponding tokens in the baseline code.

Other features and advantages of the present invention should be apparent from the following description of exemplary embodiments, which illustrate, by way of example, aspects of the invention.

BRIEF DESCRIPTION OF THE DRAWINGS

FIG. 2 shows representative code including tokens and operating according to the teachings of the present design;

DETAILED DESCRIPTION

The present design provides a codepath integrity check that is less costly from both a runtime and developer perspective. Rather than seeking to develop an explicit description path as is done in runtime integrity chain verification, the present design employs tokens to provide a non-deterministic CRC or checksum arrangement for verifying the codepath. The present design provides a balance between detection of an erroneous code path quickly, such as is done using error detection values such as a checksum or CRC evaluation, and detecting an errant condition at runtime, with minimal overhead in configuring the system.

The present design may be implemented in a variety of systems that employ error checking of code, including but not limited to computer networking systems, military systems, medical systems, transportation systems, aeronautical systems, electronics systems, entertainment systems, production systems, and industrial systems. The design presented herein may be employed, for example, in a medical system configured to perform ophthalmic surgery, such as a phacoemulsification system or a diagnostic system, laser vision correction system, and so forth.

As used herein, the concept of "code" includes any type of code written or writeable in any programming language, including but not limited to C, C++, XML, HTML, Java, JavaScript, Perl, FORTRAN, BASIC, PASCAL, PHP, Python, Ruby, and SQL.

Figure 1:
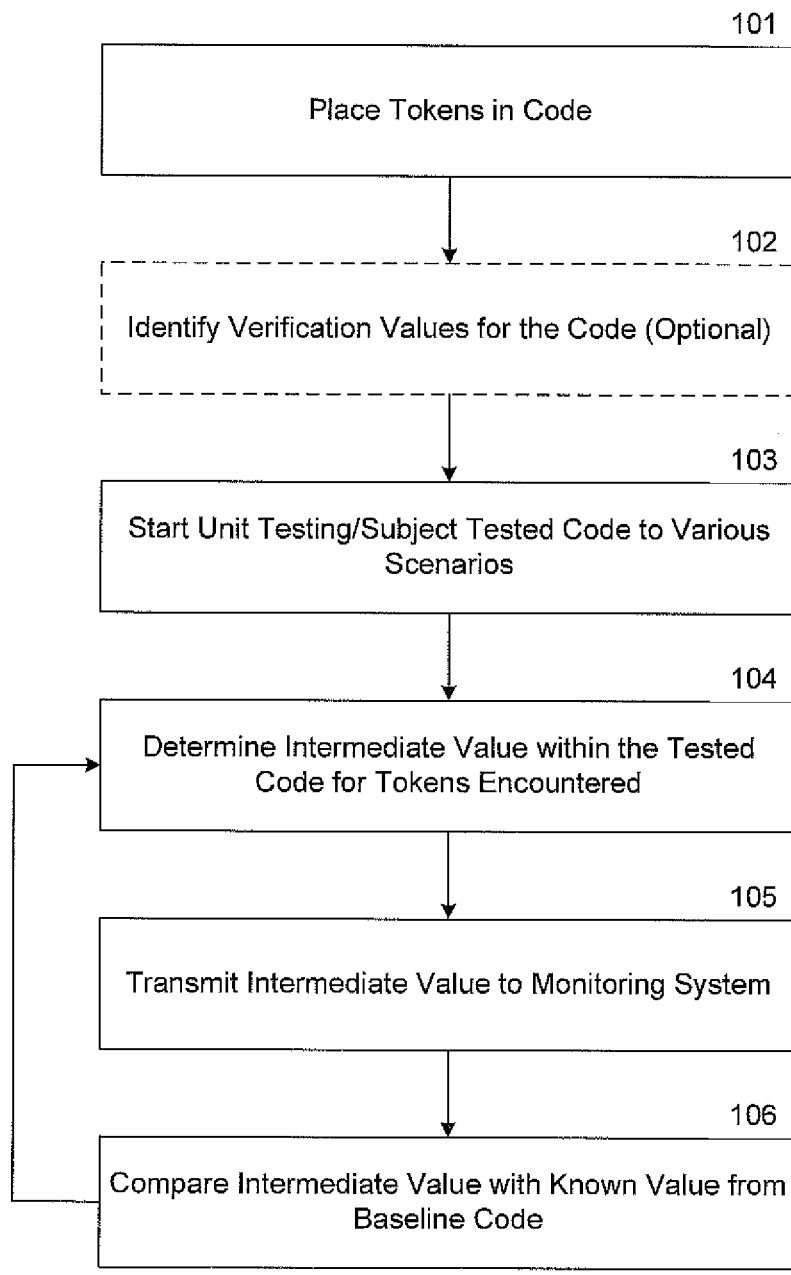
FIG. 1 illustrates a flowchart of a first embodiment of the present design.

FIG. 1 illustrates a flowchart of the general design. In FIG. 1, the developer initially places tokens before and/or after code branches in a code path at point 101. In general, a token is a code element that can be queried during runtime and return a value of any sort, including a constant, a computed value, an instruction, an equation, or otherwise. The intent of distributing tokens in this manner is to provide an indication or marking within code that can provide a predictable or known value usable to determine that the code, during execution/testing, is executing appropriately. Certain implementations of tokens are disclosed herein, but the token is to be interpreted broadly and is in general code that does not materially affect subsequent code functionality, and is not a value or variable that in any way affects code execution, but is generally a waypoint or observation point that provides the code with reporting or status capability.

Tokens in the present design are typically distributed at branch points or the beginning of branches or paths of code. For the purposes of the present design, the concepts of branches and paths are intended broadly. In general, a branch is any path that splits away from a preceding path, such as a branch splitting from a tree. In the present context, a branch may be any point of interest in the code. However, as many faults have to do with improper execution of different code pieces, including loops or an improper decision being made in code, a developer can place tokens in point 101 at any path that could potentially be problematic. Thus if a path of code is always executed and possibility of such a path of code causing a fault is zero, the developer may choose to use no tokens with such a code branch. Again, as used herein, "branch" is intended broadly and means any code path of interest. It should be noted that placement of tokens can therefore be subjective, and one developer may place tokens at positions of little or no interest to other developers. Point 101 is intended to indicate tokens are placed in the code at selected points.

Verification values in the code can be identified or established at point 102. Establishing verification values entails establishing values associated with tokens, such as error detection values, that may be used to verify proper code execution. In one instance, a checksum or CRC may be employed at the position of a token inserted in the code, but any appropriate value may be employed.

Point 103 represents the start of code testing. Testing in this application may encompass unit testing, wherein code is evaluated on its own, or fielded code integrity checking, wherein the code is deployed with integrity testing built into the system such that evaluation can be performed in the product prior to shipment as well as while the product is in the field. Such fielded code integrity checking capability can facilitate fail-safe operation of the device and can provide post-failure information and diagnostics. As used herein, the term "unit testing" is intended to mean both code testing of code not deployed in a product as well as code testing performed in the product prior to shipping and/or while the product and code are deployed in the field. Thus point 103 is intended to always be performed whenever the instrument or subject executable is run.

Unit testing employs the tokens previously placed and incorporates them, either alone or together with other data, into a running sum, checksum, or CRC evaluation. Any verification values identified at point 102 encountered during unit testing can cause the system to evaluate the current state of the sum, checksum, or CRC value, including tokens expected to have been encountered up to that verification point. Point 104 represents the determination of an intermediate value, such as an intermediate running sum, checksum, or CRC value, where point 105 transmits the intermediate value to a monitoring system. Such transmission may be provided for in the code, i.e. the code may include a runtime communication path of the intermediate value to the monitoring system.

At point 106, the monitoring system uses the values transmitted and compares the received values to known values appropriate for the system state. Any applicable system state may be evaluated, and state changes may be provided from the observed program to the monitoring program. The monitoring program may update the state upon receipt of a state change at the observed program. If an error or mismatch exists, such an error condition may be transmitted in some manner, such as by notifying a user via a message or making a record or log of the error(s), which may be gathered/pulled by a user upon request or automatically sent to a user at programmed/preprogrammed time intervals, and processing may be halted or may continue. A report may be generated identifying all mismatches or faults encountered during testing, or some other error reporting may occur, such as, but not limited to sending a message to a user or making a record or log of the error(s), which may be gathered/pulled by a user upon request or automatically sent to a user at programmed/preprogrammed time intervals.

FIG. 2 illustrates code in the observed system employing tokens. At point 201, the program initializes a variable (var). At point 202, the call to runtimeCodepathVerificationInit causes the monitoring system to index the precomputed result of an error detection value, such as a checksum or CRC, of the MODTOKEN when in STATE0. Point 203 represents the reading of input and setting var equal to the input.

The monitoring system thus computes the checksum or CRC of the received TOKEN1320 for each code iteration in STATE0 and compares the checksum or CRC determined that the observed system computed and transmitted via the command 204. When the call readInput( ) returns with a value less than X, code 205 executes, and the monitoring system receives a state change notification that the observed program has changed state to STATE1. The monitoring program indexes a STATE1 table and computes the CRC or the checksum of MODTOKEN in STATE1 combined with TOKEN1321 and compares the computed value to the value transmitted by the observed system. In this arrangement, the checksum or CRC may include both the value of the token (TOKEN1321) and the value (CRC or checksum) of MODTOKEN in STATE1.

Code 206 is the path followed if the value of var is less than X. In this situation, the state changes to STATE2 and further processing may occur. Note that additional code may be provided below code blocks 205 and 206, where the interest is in finding the change of state and token value in the runtimeCodePathVerification statements.

The present design provides an initial state and an initial value is associated with this state. In FIG. 2 the initial state is STATE0 and the initial value is TOKEN1320, which may take any value. Each token value is typically unique with respect to other tokens employed. Each time the "while" loop of FIG. 2 is executed, the final runtimeCodepathVerificationPoint will be executed for TOKEN1320 at point 204. Execution of this runtimeCodepathVerificationPoint while the code is undergoing testing results in the code being tested determining the value TOKEN1320, computing an error detection value such as a CRC or checksum, and passing these values to the monitoring module or code. The monitoring module or monitoring code has available the value for TOKEN1320, such as either from previous storage of the value or by obtaining the value from a source external to the code being tested. The monitoring module or monitoring code computes a corresponding error detection value, i.e. the value associated with STATE0.

In the FIG. 2 example, TOKEN1320 is considered valid by the monitoring system for any of STATE0, STATE1, and/or STATE2, as var may be less than X, (STATE1), greater than X (STATE2) or equal to X (STATE0).

In FIG. 2, changes in state from STATE0 result in a different token, having a different value provided from the code being tested, such as a change to STATE1 resulting in TOKEN1321 being provided. The monitoring module or monitoring code receives TOKEN1321 and the error detection value associated with STATE1, and a comparison is made to determine the validity of the code at this point under the presently tested condition and state. Where the code includes multiple tokens per state, the monitoring system also evaluates such sequencing and token usage.

Values available in or maintained in the monitoring system may include accepted values for certain states and conditions. Multiple such values, checksums, and states may be provided. For example, one branch of code, called branch 1200, may provide a series of values, 1200A through 1200K, where a subsequent branch of code 1400 requires that if 1200C is true, branch 1422 should never be executed. Hence depending on the various states of various code branches, values, and so forth, different acceptable and unacceptable state and value conditions may be available to the monitoring program.

Evaluation may also include analysis of sequencing. For example, in STATE1, more calls to runtimeCodepathVerificationPoint( ) may be made than shown in FIG. 2. If no intervening branches exist, the monitoring system would expect that token sequencing would proceed as analyzed in the baseline program or subject code. The monitoring program would detect an error if token sequencing differs from expectations. Thus in general, no more than one call to runtimeCodepathVerificationStatePoint( ) will occur per branch of subject code, but at least one call to runtimeCodepathVerificationPoint( ) will occur per branch in the subject code. The monitoring program analyzes the runtime data stream for the sequencing of runtimeCodepathVerificationPoint( ) occurrences between calls to runtimeCodepathVerificationStatePoint( ).

While discussed herein with respect to a "monitoring program" or "monitoring code" or the like, it is to be understood that any device, module, or code may be employed to obtain the state/token information from the code being tested, including the error detection values, obtain the corresponding state/token information from the baseline or monitoring code, and a comparison may be made by any device, module, or code as to whether the values provided correspond and/or whether an error condition exists. In particular, such evaluation may be performed by the monitoring device or any other device available to perform such a comparison.

One example of a failure in the present situation would be a stack corruption that occurs during application of state processing of "STATE2 var>X". As a result of this stack corruption, the return address is corrupted (i.e. the address to which execution is to return) causing execution to jump to the address immediately preceding the call runtimeCodepathVerificationPoint(TOKEN1321). When the application then proceeds in runtimeCodepathVerificationPoint(TOKEN1321), the system, either the observed program or the monitored program, will compute a value, such as a CRC or checksum, based on the current running value plus the erroneous TOKEN1321 when TOKEN1322 is expected. The monitoring program computes the error detection value, e.g. CRC or checksum, associated with the correct code path, and the monitoring program will determine that the CRC or checksum will not compare equal. The monitoring system then determines an error situation.

Figure 3:
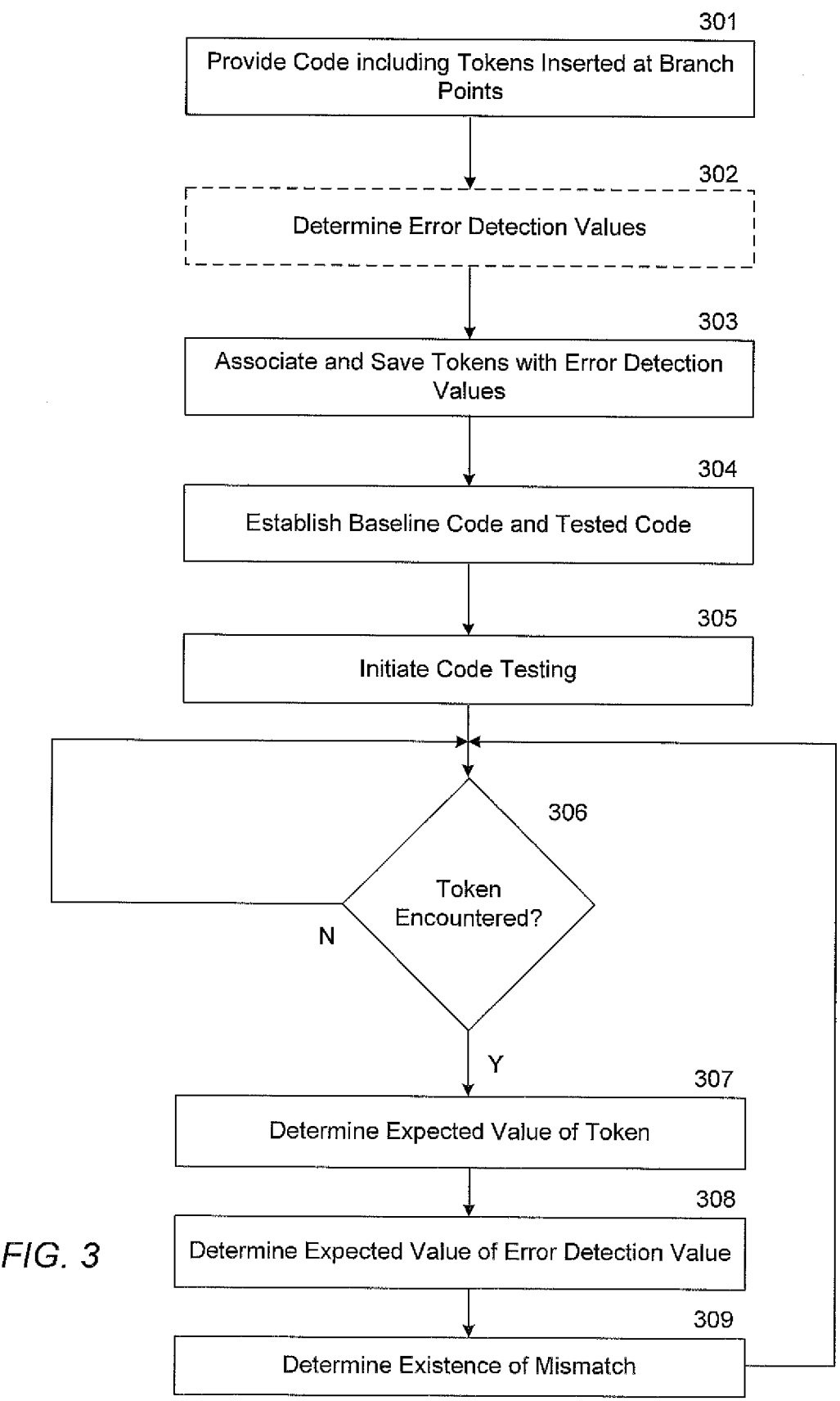
FIG. 3 is a flowchart of an alternate embodiment of the present design.

A flowchart of an alternate embodiment of the present design is illustrated in FIG. 3. From FIG. 3, the method at point 301 enables the user to provide code including tokens inserted at branch points in the code path. Tokens again may be computer codepath verification values or locations and may include any type of available and appropriate computer value or expression, including but not limited to constants, variables, expressions, jump instructions, equations, or otherwise, each producing a value associated with the particular token. Branches may include any logical code sequence that may be executed depending on whether flow control is changed or not. In other words, a branch is a point in the code where the decision is made to execute subsequent steps A or steps B. The use of tokens results in a second verifiable resource in addition to computing an error detection value such as a CRC or checksum.

Point 302 contemplates the code has been written including the tokens. Point 302 is optional and calls for determining an error detection value or values, such as a checksum or CRC or any other value known in the art, for various points along the codepath including at the points where the tokens are placed. The error detection value(s) may be determined at one location or multiple locations as desired. A programmer may, for example, be interested in every location where a division is to occur and, to avoid division by zero, may determine a checksum or CRC or other error detection value at those points.

Alternately, such an error detection value may not be determined at this stage, but may be calculated during testing, or on the fly, by evaluating the current code under evaluation against a reference code. In such an implementation, the testing device would evaluate the reference code and determine, for example, a checksum for the current codepath location, while the testing device would also evaluate the currently tested code and determine, for example, a checksum for the current codepath location. The testing device would compare the error detection value for the reference code with the error detection value for the currently tested code.

Thus point 302 is optional, but at some point, either prior to testing or during testing, at least one and possibly several error detection values may be determined. Point 303 provides for an association between tokens and error detection values. As an example, when code testing reaches TOKEN1321, the error detection value (CRC or checksum, for example) should be X. While shown in FIG. 3 as occurring prior to testing, such operation may occur partially during testing. As an example, if TOKEN1321 has been reached and the specific line of code where TOKEN1321 is called out is line AAAA, the testing program may assess the reference code and compute a checksum for line AAAA and compare the checksum for line AAAA from the reference code to the checksum for line AAAA for the currently tested code. Thus while the tokens may be known, the error detection codes may be determined on the fly or, as shown by point 303, prior to testing.

Point 304 represents the establishing of baseline or reference code and tested or currently tested code. Currently tested code is run through a variety of situations to determine integrity. The reference code may be obtained in any manner, such as from a database, or even reproduced from the currently tested code. In either event, two versions of code are obtained for testing. The baseline or reference code is used by a verification device to verify the tokens and associated error detection values received from the tested code.

Point 305 represents testing, wherein the tested code is subjected to a variety of possibilities or options, potentially executing various code branches and various conditions, variables, and so forth. Again, the term "testing" is intended to be interpreted broadly herein, and may include testing prior to deployment, such as during a pre-deployment code verification or testing phase, or may take place in a fielded device. FIG. 3 and all other drawings are intended to include a broad interpretation of the term "testing." Point 306 evaluates whether a token has been encountered. If such a token has not been encountered, the testing continues. If such a token has been encountered, the testing device, which may include a monitoring program in any type of device and/or a device configured to perform testing, evaluates both the status or identity or expected value of the token at point 307 and the testing device determines an error detection value for the position of the token at point 308. The value of the token is known to the testing device, and may be obtained from a database, or may have been provided by the programmer in some form, such as a listing of expected token values. The line of code or location where the token appears is also available to the testing device. At point 309, the testing device determines whether a mismatch occurs, such as either the token obtained from the currently tested code does not match the expected value of the token, or the error detection code associated with the token does not match the expected error detection code, the testing device indicates an error has occurred. The system then loops back from point 309 to point 306 until another token is encountered.

As mentioned, the placement of tokens is intended to be at locations of interest in the code, such that evaluation of code does not require merely determination of error detection values (checksums, etc.) but also is not as time and resource intensive as full runtime integrity chain verification.

Figure 4:
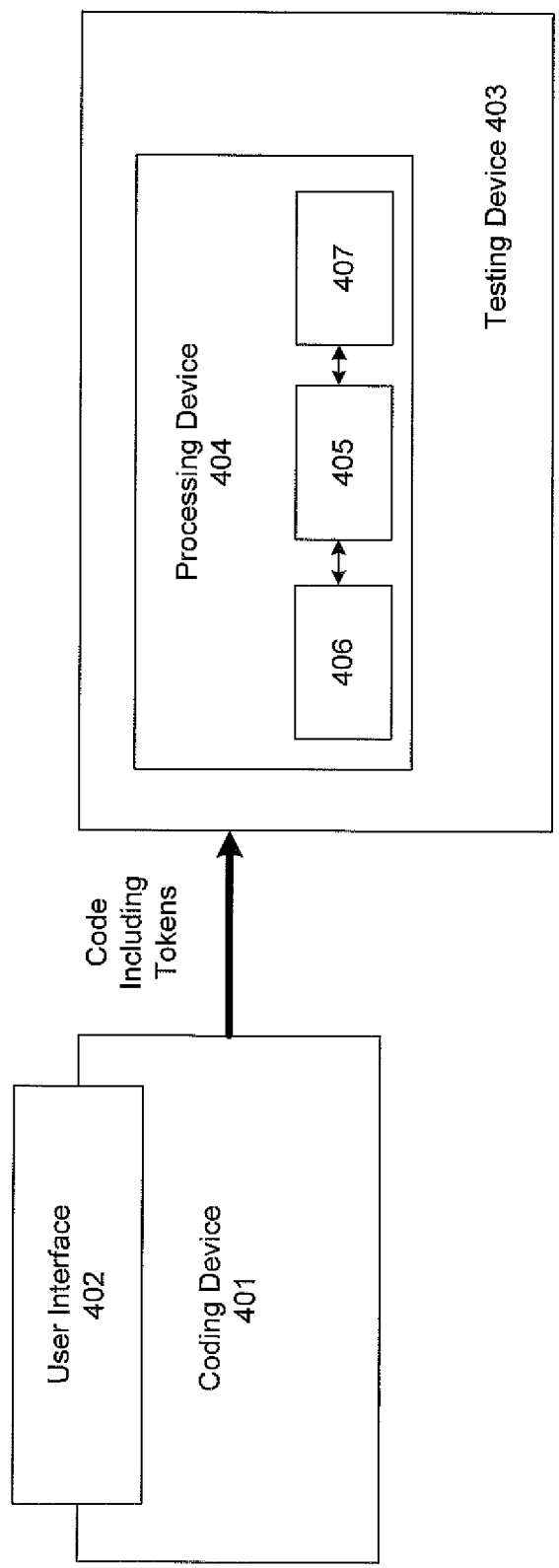
FIG. 4 illustrates an apparatus or system operating in accordance with the present design.

A representative design is provided in FIG. 4. From FIG. 4, there is provided a coding device 401, wherein a user or programmer may provide code including tokens via user interface 402. The code so produced may be compiled, including the tokens, and may be provided to testing device 403. In one embodiment, coding device 401 and testing device 403 may be the same device, and in another embodiment they may be different. As noted, the tested code is typically available to a processor or processing device 404 at the testing device 403, and the reference code is either obtained by or available to testing device 403. Processing proceeds using various modules, such as an evaluation module 405 that subjects the code to testing, a token evaluation module 406, and an error evaluation module 407. In the case of an error, error information may be provided in any acceptable manner, including by a printout, stopping testing and evaluation, providing error information to a screen or other user information location, and so forth. In this manner, using such a device, errors may be determined in a faster and more efficient manner than previous methods.

Thus according to one aspect of the present invention, there is provided a method and apparatus for testing code. The method includes inserting at least one token in program code, wherein each token comprises a code element able to provide a value during runtime, establishing a baseline code version and an executing code version from the program code, and subjecting the executing code version to various testing conditions using a processing device. Subjecting the executing code version to various testing conditions comprises periodically evaluating at least one executing code token having one associated executing error detection value against the at least one baseline code token having one associated baseline error detection value and reporting an error when at least one executing code token and associated executing error detection pair fails to match at least one baseline code token and associated baseline error detection pair.

Alternately, the present design may include providing a plurality of tokens in program code, establishing baseline code and testing code from the program code, determining error detection values for tokens in the baseline code, employing the processing device to subject the testing code to various testing conditions, comparing error detection values obtained from the testing code subjected to various testing conditions for tokens in the testing code to the error detection values for corresponding tokens in the baseline code, and establishing an error condition when error detection values from the testing code fail to match error detection codes for corresponding tokens in the baseline code.

Those of skill in the art will recognize that any step of a method described in connection with an embodiment may be interchanged with another step without departing from the scope of the invention. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Alternately, the present design may include an apparatus for testing code comprising a plurality of tokens provided in program code, the program code used to establish baseline code and testing code, wherein error detection values are available for tokens in the baseline code. The apparatus comprises a processing device configured to subject the testing code to various testing conditions, and a comparison device configured to compare error detection values obtained from the testing code subjected to various testing conditions for tokens in the testing code to the error detection values for tokens in the baseline code and establish an error condition when a mismatch occurs.

The various illustrative logical blocks, modules, and circuits described in connection with the embodiments disclosed herein may be implemented or performed using a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A code testing method executable on a processing device, comprising:
    inserting at least one token in program code, wherein each token comprises a code element able to provide a value during runtime and the token does not materially affect subsequent code functionality;
    establishing a baseline code version and an executing code version from the program code;
    subjecting the executing code version to various testing conditions using the processing device;
    detecting execution of the token; and
    performing additional analysis if the token is detected;
    wherein the additional analysis includes:
    evaluating at least one executing code token having one associated executing error detection value against the at least one baseline code token having one associated baseline error detection value,
    reporting an error when at least one executing code token and associated executing error detection pair fails to match at least one baseline code token and associated baseline error detection pair, and
    determining whether or not to continue code testing if an error condition is established,
    wherein the one associated executing error detection value and one associated baseline error detection value comprise at least one from a group consisting of a cyclic redundancy check (CRC) and a checksum.

2. The code testing method of claim 1, wherein each token is inserted at a code branch.

3. The code testing method of claim 1, further comprising establishing a plurality of baseline error detection values associated with a corresponding plurality of baseline code tokens prior to subjecting the executing code version to various testing conditions.

4. The code testing method of claim 1, wherein the various testing conditions comprise running at least one section of code through a plurality of different states.

5. The code testing method of claim 1, wherein the inserting and the subjecting occur on a plurality of processing devices.

6. A method of testing code using a processing device, comprising:
    providing a plurality of tokens in program code, wherein each token comprises a code element able to provide a value during runtime and each token does not materially affect subsequent code functionality;
    establishing baseline code and testing code from the program code;
    determining error detection values for tokens in the baseline code;
    employing the processing device to subject the testing code to various testing conditions;
    detecting execution of the token; and
    performing additional analysis if the token is detected;
    wherein the additional analysis includes:
    comparing error detection values obtained from the testing code subjected to various testing conditions for tokens in the testing code to the error detection values for corresponding tokens in the established baseline code,
    establishing an error condition when error detection values from the testing code fail to match error detection codes for corresponding tokens in the baseline code, and
    determining whether or not to continue code testing if the error condition is established,
    wherein each error detection value comprises at least one from a group consisting of a cyclic redundancy check (CRC) and a checksum.

7. The method of testing code of claim 6, wherein each token in the program code is inserted at a code branch.

8. The method of testing code of claim 6, wherein the various testing conditions comprise running at least one section of code through a plurality of different states.

9. The method of testing code of claim 6, wherein the method occurs on a plurality of processing devices.

10. An apparatus for testing code comprising a plurality of tokens provided in program code, the program code used to establish baseline code and testing code, wherein error detection values are available for tokens in the baseline code, comprising:
    a processing device configured to subject the testing code to various testing conditions; and
    a comparison device configured to:
    detect execution of the token, wherein the token comprises a code element able to provide a value during runtime and the token does not materially affect subsequent code functionality,
    if the token is detected, compare error detection values obtained from the testing code subjected to various testing conditions for tokens in the testing code to the error detection values for tokens in the baseline code and establish an error condition when a mismatch occurs, and
    determine whether or not to continue code testing if the error condition is established,
    wherein each error detection value comprises at least one from a group consisting of a cyclic redundancy check (CRC) and a checksum.

11. The apparatus for testing code of claim 10, wherein each token in the program code is inserted at a code branch.

12. The apparatus for testing code of claim 10, wherein the various testing conditions comprise running at least one section of code through a plurality of different states.

13. The apparatus for testing code of claim 10, wherein the plurality of tokens are established using a separate processing device.

14. The apparatus for testing code of claim 10, wherein the apparatus is employed in a medical system configured to perform ophthalmic surgery.

* * * * *